United States Patent
Furukawa

[19]

[11] Patent Number: 6,115,614

[45] Date of Patent: Sep. 5, 2000

[54] PILOT SIGNAL RECEPTION LEVEL AVERAGING SYSTEM

[75] Inventor: Hiroshi Furukawa, Tokyo, Japan

[73] Assignee: NEC Corporporation, Tokyo, Japan

[21] Appl. No.: 09/144,879

[22] Filed: Sep. 1, 1998

[30] Foreign Application Priority Data

Sep. 2, 1997 [JP] Japan ................................. 9-237268

[51] Int. Cl.[7] ............................. H04B 17/00; H04Q 7/00
[52] U.S. Cl. ...................... 455/525; 455/67.6; 370/331
[58] Field of Search ............................ 455/67.6, 525, 455/442, 437, 440, 524, 456, 423; 370/331, 335, 342

[56] References Cited

U.S. PATENT DOCUMENTS

| | | | |
|---|---|---|---|
| 5,381,444 | 1/1995 | Tajima | 375/1 |
| 5,689,812 | 11/1997 | Takahashi | 455/67.6 |
| 5,926,768 | 7/1999 | Lewiner et al. | 455/562 |
| 6,021,316 | 2/2000 | Heiska et al. | 455/67.6 |

*Primary Examiner*—Fan Tsang
*Assistant Examiner*—Sheila Smith
*Attorney, Agent, or Firm*—Scully, Scott, Murphy & Presser

[57] ABSTRACT

Pass band characteristics of an averaging filter is controlled in accordance with a predicted bandwidth occupied for propagation loss fluctuation that is obtained by a propagation loss fluctuation bandwidth predicting unit. For the prediction of the propagation loss fluctuation bandwidth, a fluctuation rate of pilot signal reception levels is measured by a mobile station as well as the radius of a cell and the height of an antenna. The pass band of the averaging filter is broaden with the prediction that the faster the pilot signal reception levels fluctuate and the smaller the cell radius is, the faster the propagation loss fluctuates.

9 Claims, 8 Drawing Sheets

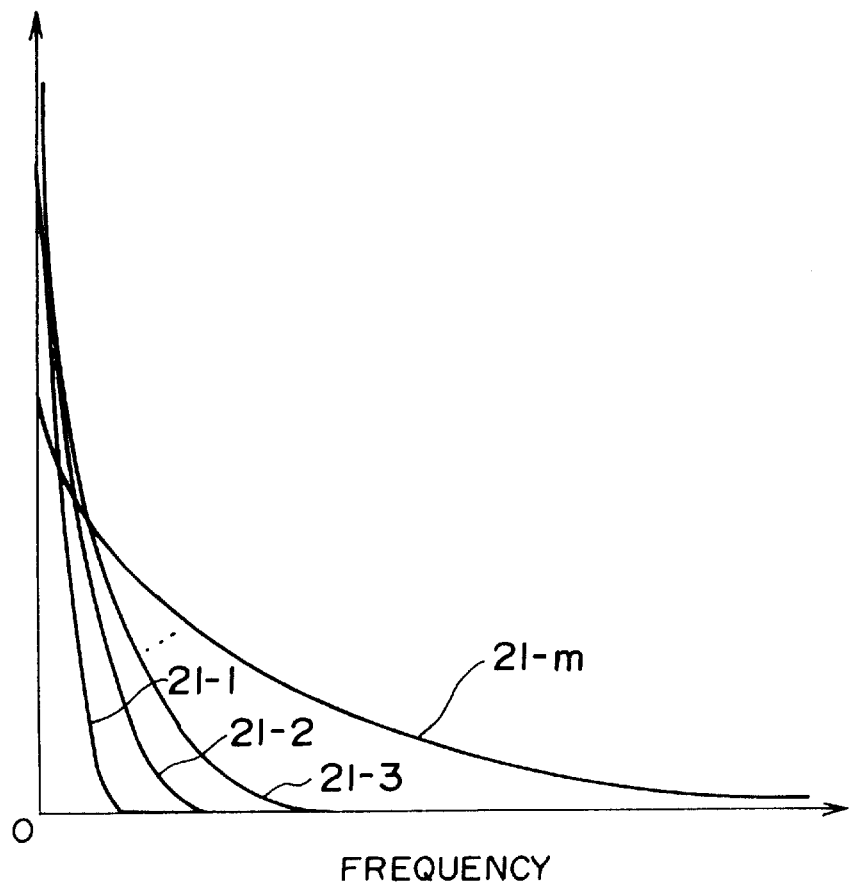
F I G. 8
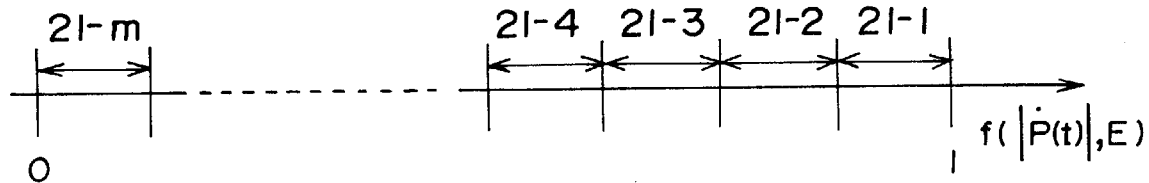
F I G. 9

PILOT SIGNAL RECEPTION LEVEL AVERAGING SYSTEM

BACKGROUND OF THE INVENTION

The present invention relates to a cellular mobile radio communication system including base stations that send pilot signals all the time and a mobile station or stations each adapted to receive the pilot signals to choose the base station with the strongest pilot signal power among all received pilot signals. More specifically, the present invention relates to a pilot signal reception level averaging system for precisely determining a propagation loss between the base stations and the mobile station.

A cellular mobile radio communication system is known as an example of the cellular mobile radio communication system. Such a system includes a number of radio base stations scattered therein and they use the same frequency range at the same time. On the other hand, the mobile station normally establishes connection between one of the base station with the minimum propagation loss. The mobile station establishes communication with the base station with the minimum transmission power by means of transmission power control. The transmission power control minimizes interference to any other radio channels and thus increased number of mobile stations can access the particular base station simultaneously. The base stations transmit pilot signals to the mobile station all the time. The mobile station estimates the propagation loss from the received pilot signal. The pilot signal serves as an index for the transmission power control or choice of the base station that the mobile station accesses.

The reception level at which the mobile station receives the pilot signals fluctuates due to a propagation loss and a fading component overlapped with the propagation loss. The reception level for the pilot signal with the overlapped fading fluctuation component increases an error in transmission power control when the mobile station performs the transmission power control or chooses the base station. Such an error may cause improper choice of the base station of the minimum propagation loss for the mobile station in question. Therefore, the propagation loss component is acquired by means of averaging the reception levels at which the pilot signals are received.

Referring to FIG. 1, an averaging technique used conventionally is described. A pilot signal of a reception level P passes through n number of delay circuits 100-1 through 100-n. A summing unit 200 calculates an average of the reception levels at which the n number of past pilot signals are received. The summing unit 200 thus obtains an averaged pilot signal reception level $P_0$.

FIG. 2 is a graphical representation of the above-mentioned averaging operation. At the beginning of observation, the reception levels at which the pilot signals are received is suffered from level fluctuation with the fading fluctuation component overlapped with the propagation loss component. Then, the fading fluctuation component is limited by means of the averaging. The resultant reception level is well in proportion with the propagation loss component.

However, referring to FIGS. 3 and 4, a fluctuation profile for the reception level at which the pilot signal is received changes depending on various factors including a moving speed and a transmission environment of the mobile station. Accordingly, there is a case that the correct propagation loss component can not be acquired, even if the pilot signals received is averaged constantly. For example, the reception level for the pilot signals that is averaged with a conventional averaging technique is not significantly different from the reception level before averaging with a relatively sluggish fading fluctuation profile. On the contrary, rapid fluctuation of the propagation loss results in excessive averaging, which causes averaging of the propagation loss fluctuation as well.

As described above, the conventional technique cannot provide precise and correct acquirement of the propagation loss component out of the pilot signal reception level. This may cause incorrect choice of the base station by the mobile station and undesirable increase of the transmission power control error. The problem is particularly significant in the code division multiple access cellular mobile radio communication system because incorrect choice of the base station with the minimum propagation loss results in the interference to other radio channels, decreasing the total number of mobile stations that the communication system can handle.

SUMMARY OF THE INVENTION

Therefore, an object of the present invention is to provide a pilot signal reception level averaging system for averaging reception levels at which pilot signals are received by means of acquiring only a propagation loss component more precisely.

A pilot signal reception level averaging system for averaging reception levels at which pilot signals are received according to the present invention is characterized by controlling a pass band characteristics of a variable filter based on an expected occupied bandwidth of a propagation loss fluctuation obtained in a propagation loss fluctuation bandwidth expecting unit.

According to the present invention, a cellular mobile radio communication system comprises base stations that send pilot signals all the time and a mobile station having a device for use in determining a reception level of the transmitted pilot signal as a pilot signal reception level. The base station has a propagation environment parameter determining unit for determining a propagation environment parameter, and a transmission unit for transmitting the propagation environment parameter to the mobile station. The mobile station has a reception unit for receiving the propagation environment parameter, a pilot signal reception level fluctuation rate detection unit for detecting a fluctuation rate of the pilot signal reception level, a propagation loss fluctuation bandwidth predicting unit for predicting a fluctuation bandwidth for a propagation loss component included in the pilot signal reception level, and an averaging filter that can modify the pass band characteristics. The mobile station predicts, as a predicted fluctuation bandwidth, the fluctuation bandwidth for the propagation loss component included in the pilot signal reception level, based on the propagation environment parameter and the fluctuation rate of the pilot signal reception level received by the reception unit. The mobile station determines the pass band characteristics of the averaging filter according to the predicted fluctuation bandwidth. The pilot signal passes through the averaging filter with the determined pass band characteristics. As a result, only the propagation loss component is acquired.

BRIEF DESCRIPTION OF THE DRAWINGS

FIG. 8 is a graphical representation showing frequency characteristics of fixed filters implemented in the present invention;

FIG. 9 is a view illustrating an example of the relation between the propagation loss fluctuation bandwidth evaluation function and the fixed filter applied to and implemented in the present invention;

DESCRIPTION OF THE PREFERRED EMBODIMENTS

As described above, a cellular mobile radio communication system includes a number of radio base stations scattered therein. The base stations use the same frequency range at the same time. On the other hand, the mobile station normally establishes connection between one of the base station with the minimum propagation loss. The mobile station establishes communication with the base station with the minimum transmission power by means of transmission power control. The transmission power control minimizes interference to any other radio channels and thus increased number of mobile stations can access the particular base station simultaneously. The base stations transmit pilot signals to the mobile station all the time. The mobile station estimates the propagation loss from the received pilot signal. The pilot signal serves as an index for the transmission power control or choice of the base station that the mobile station accesses.

The reception level at which the mobile station receives the pilot signals has a fading fluctuation component that fluctuates rapidly into a propagation loss fluctuation component with a sluggish fluctuation profile. The reception level for the pilot signal with the overlapped fading fluctuation component increases an error in transmission power control when the mobile station performs the transmission power control or chooses the base station. Such an error may cause improper choice of the base station of the minimum propagation loss for the mobile station in question. Therefore, the propagation loss component is acquired by means of averaging the reception levels at which the pilot signals are received.

According to the conventional technique for averaging the reception levels at which the pilot signals are received, the reception levels at which the pilot signals are received is suffered from level fluctuation with the fading fluctuation component overlapped with the propagation loss component. Then, the fading fluctuation component is limited by means of the averaging. The resultant reception level is well in proportion with the propagation loss component.

However, a fluctuation profile for the reception level at which the pilot signal is received changes depending on various factors including a moving speed and a transmission environment of the mobile station. This means that certain constant averaging of the pilot signals received does not always ensure correct acquirement of the propagation loss component. For example, the reception level for the pilot signals that is averaged with a conventional averaging technique is not significantly different from the reception level before averaging with a relatively sluggish fading fluctuation profile. On the contrary, rapid fluctuation of the propagation loss results in excessive averaging, which causes averaging of the propagation loss fluctuation as well.

Figure 1:
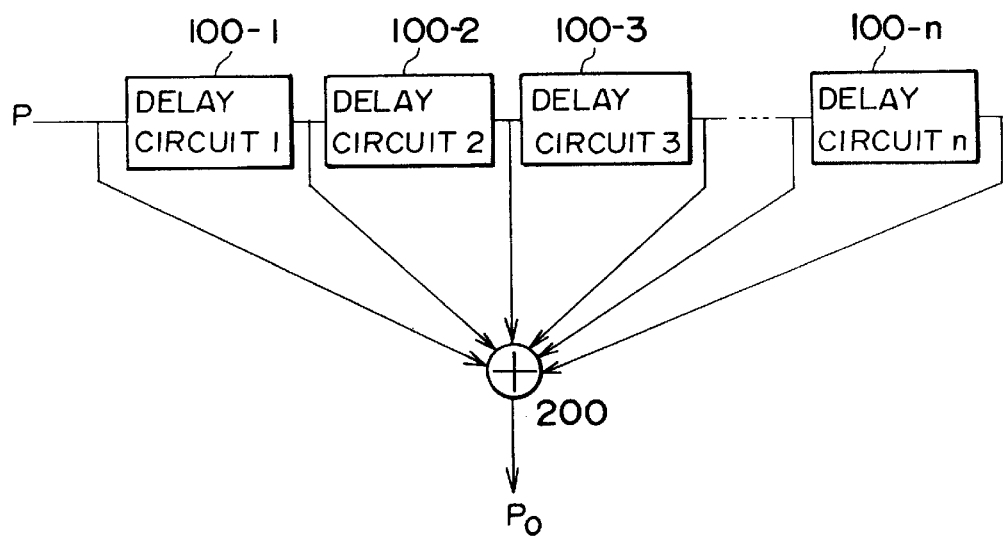
FIG. 1 is a block diagram for use in describing configuration of conventional technique for averaging reception levels at which pilot signals are received.
Figure 2:
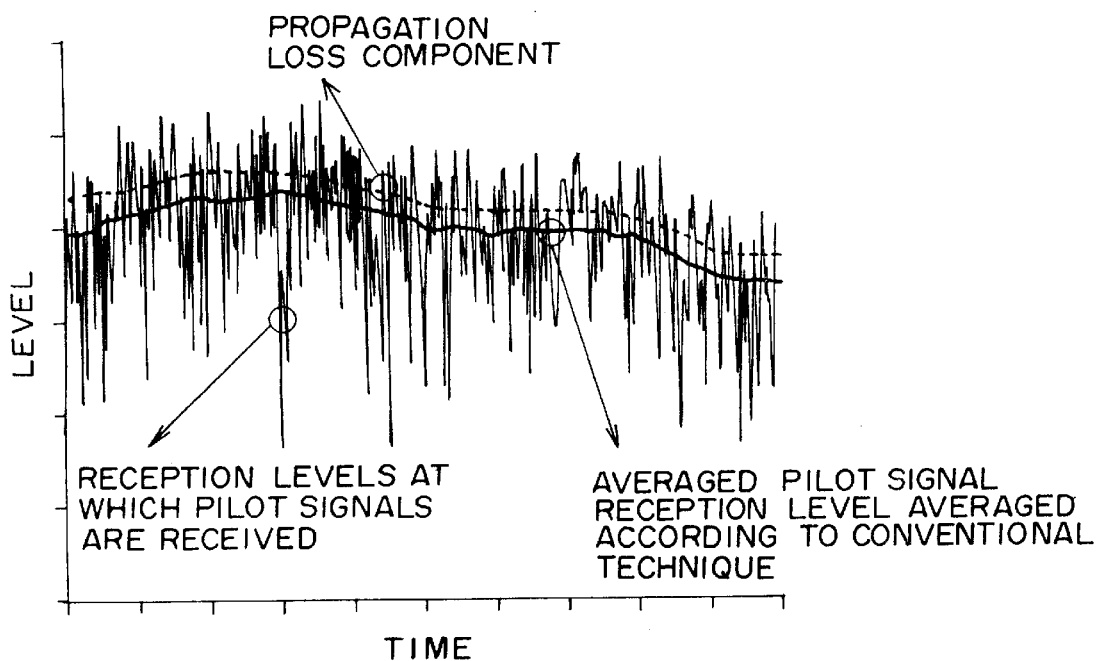
FIG. 2 is a graphical representation of an averaged pilot signal reception level obtained by the conventional technique for averaging the reception levels at which the pilot signals are received.
Figure 3:
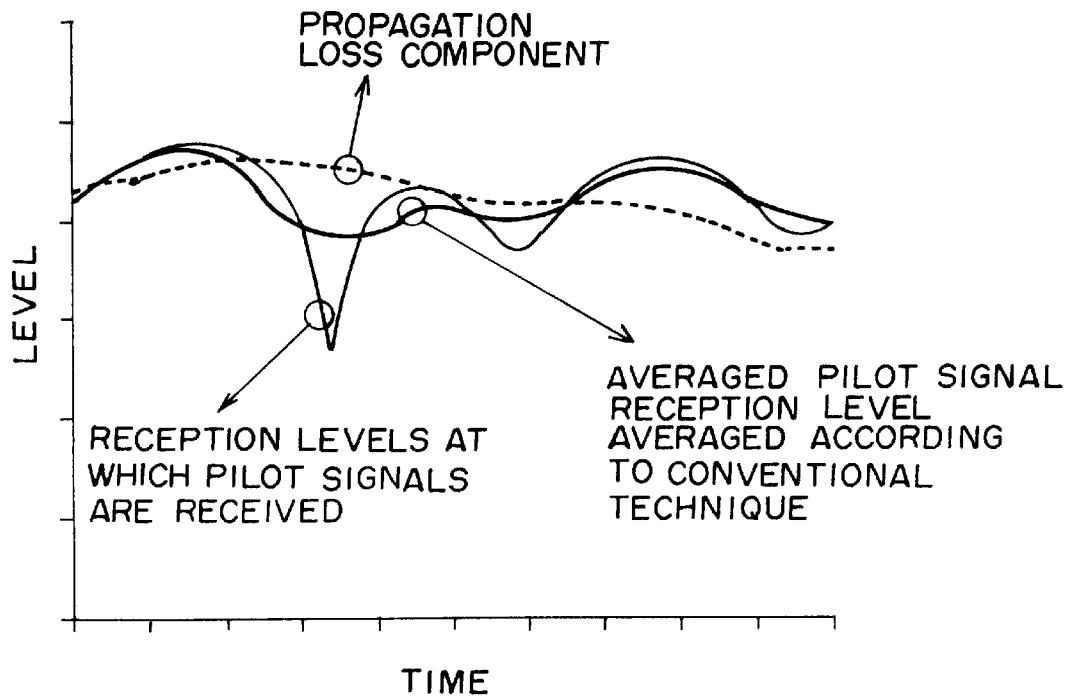
FIG. 3 is a graphical representation of an averaged pilot signal reception level obtained by the conventional technique for averaging the reception levels at which the pilot signals are received when a fading component contained in the pilot signal reception level fluctuates relatively sluggishly.

FIG. 3 is a graphical representation showing level fluctuation obtained as a result of the same averaging process except for a fading component being fluctuated more sluggish than in FIG. 2. The averaged pilot signal reception level has little difference from the reception levels before averaging at which the pilot signals are received. The degree of averaging is thus considered to be insufficient.

Figure 4:
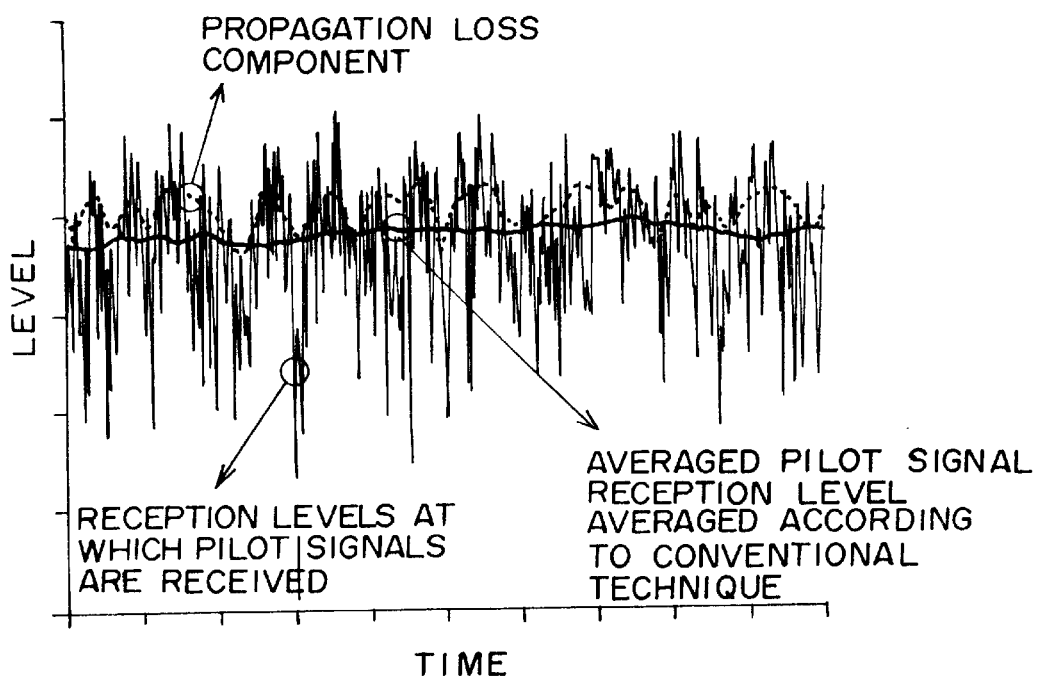
FIG. 4 is a graphical representation of an averaged pilot signal reception level obtained by the conventional technique for averaging the reception levels at which the pilot signals are received when a propagation loss component contained in the pilot signal reception level fluctuates relatively rapidly.

On the other hand, FIG. 4 is a graphical representation showing level fluctuation obtained as a result of the same averaging process except for a fading component being fluctuated faster than in FIG. 2. As apparent from FIG. 4, excessive averaging causes averaging of the propagation loss fluctuation as well. Thus, the conventional technique cannot provide precise and correct acquirement of the propagation loss component out of the pilot signal reception level. This may cause incorrect choice of the base station by the mobile station and undesirable increase of the transmission power control error. The problem is particularly significant in the code division multiple access cellular mobile radio communication system because incorrect choice of the base station with the minimum propagation loss results in the interference to other radio channels, decreasing the total number of mobile stations that the communication system can handle.

Figure 5:
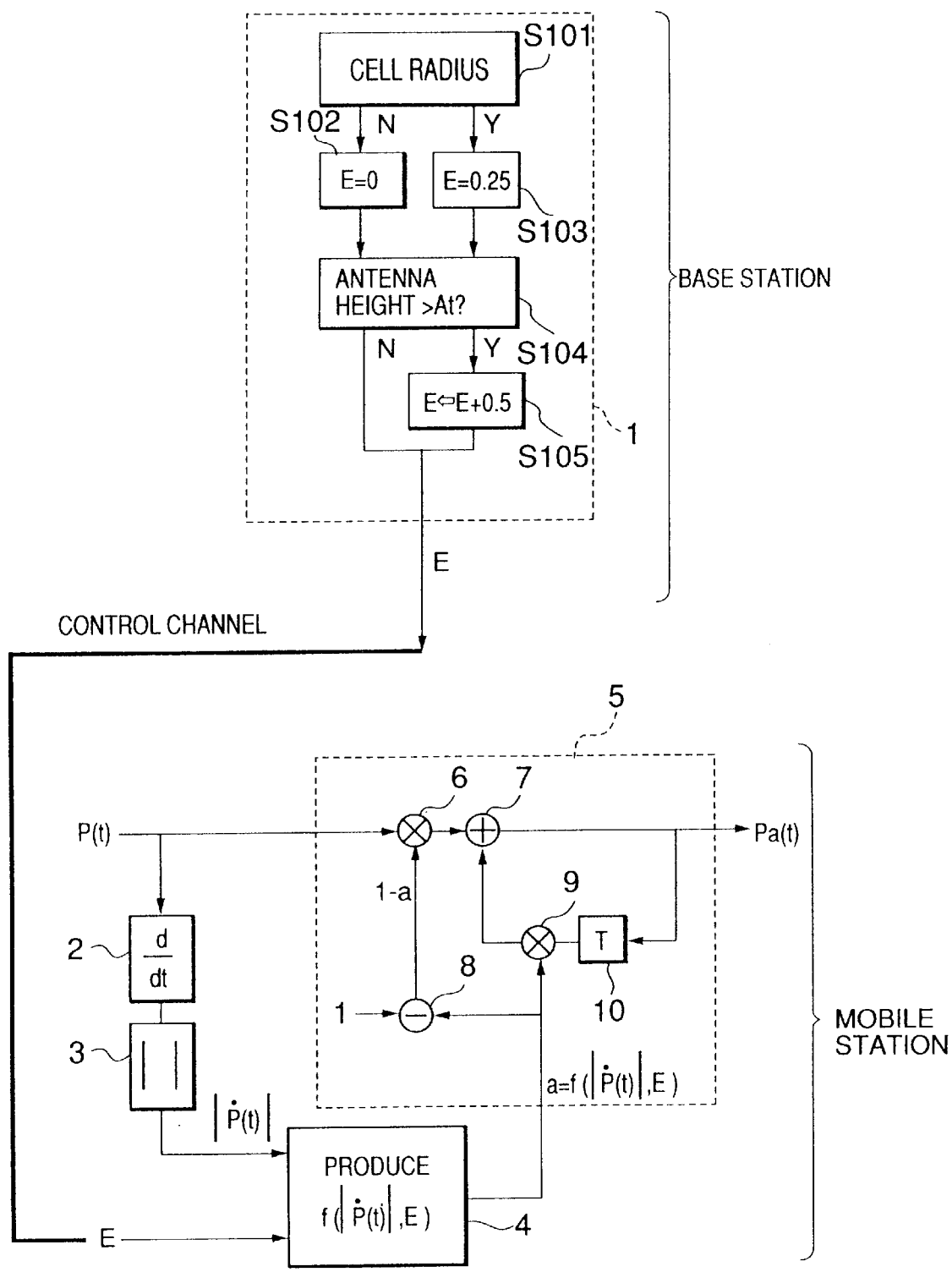
FIG. 5 is a block diagram for use in describing configuration of an averaging system for averaging reception levels at which pilot signals are received, according to an embodiment of the present invention.

Referring to FIG. 5, a first embodiment of the present invention is described. FIG. 5 is a block diagram showing configuration of a system for averaging reception levels at which pilot signals are received.

A base station comprises a propagation environment parameter determining unit 1. A mobile station comprises a differentiator 2, an absolute value circuit 3, a propagation loss fluctuation bandwidth predicting unit 4, and an averaging filter unit 5. The averaging filter unit 5 receives pilot signal reception levels P(t) and takes an average of the levels. The averaging filter unit 5 then produces an output Pa(t). The averaging filter unit 5 is formed of a primary feedback filter. The primary feedback filter changes its pass band characteristics with a feedback coefficient "a" described below. A multiplier 9 multiplies the feedback coefficient "a" with a value of the averaged output Pa(t) before a delay amount T. On the other hand, a subtraction product output of a subtractor 8 becomes (1−a). A multiplier 6 multiplies the subtraction product output (1−a) with the pilot signal reception level P(t). An adder 7 adds the output of the multiplier 6 to the output of the multiplier 9 to produce the averaged pilot signal reception level Pa(t). The feedback coefficient "a" is defined in the range of 0<a<1. The smaller the value of the coefficient is, the narrower the pass band of the averaging filter unit 5 is.

The pilot signal reception level P(t) is supplied to the differentiating circuit 2. The differentiating circuit 2 differentiates the pilot signal reception level P(t) and produces a differentiation value. The absolute value circuit 3 calculates an absolute value |P(t)'| of the above-mentioned differentiation value, that is, a fluctuation rate of the pilot signal reception level. The propagation loss fluctuation bandwidth predicting unit 4 supplied with the absolute value |P(t)'| of the differentiation value and a propagation environment parameter E notified by the base station via a control channel. The propagation loss fluctuation bandwidth predicting unit 4 predicts a propagation loss fluctuation bandwidth and controls the pass band characteristics of the averaging filter 5 according to the prediction result. In the illustrated drawings, dots above the pilot signal reception levels P(t) indicate differential value. This is also true in the following description.

A method of determining the propagation environment parameter E is described now. The propagation environment parameter E is determined in the propagation environment parameter determining unit 1 in the base station. The value of the propagation environment parameter E is defined in the range between 0 and 1, both exclusive. This definition indicates that the smaller the value of the propagation environment parameter E is, the faster the propagation loss component fluctuates. Each base station is previously supplied with information about the radius of a cell and the height of an antenna. The base station determines whether the radius of the cell is larger than a threshold value Cr for the radius of the cell (hereinafter, referred to as a cell radius threshold value Cr) (Step S101). If the radius of the cell is equal to or smaller than the cell radius threshold value Cr, then the propagation environment parameter E is determined as zero (Step S102). If the radius of the cell is larger than the cell radius threshold value Cr, then the propagation environment parameter E is determined as 0.25 (Step S103). Next, the base station determines whether the height of the antenna is larger than a threshold value At for the antenna height (hereinafter, referred to as an antenna height threshold value At) (Step S104). If the height of the antenna is larger than the antenna height threshold value At, then 0.5 is added to the value of the propagation environment parameter E (Step S105). The above procedure results in a larger propagation environment parameter E with the larger radius of the cell and antenna height. This means that the value of the propagation environment parameter E becomes larger with the more sluggish fluctuation of the propagation loss.

The propagation loss fluctuation bandwidth predicting unit 4 determines the feedback coefficient "a" according to the fluctuation rate |P(t)'| of the pilot signal reception levels and the propagation environment parameter E. The feedback coefficient "a" is given by a propagation loss fluctuation bandwidth evaluation function f with the fluctuation rate |P(t)'| of the pilot signal reception levels and the propagation environment parameter E which are used as arguments of the function. In this event, a value of the propagation loss fluctuation bandwidth evaluation function is given between 0 and 1.

Figure 6:
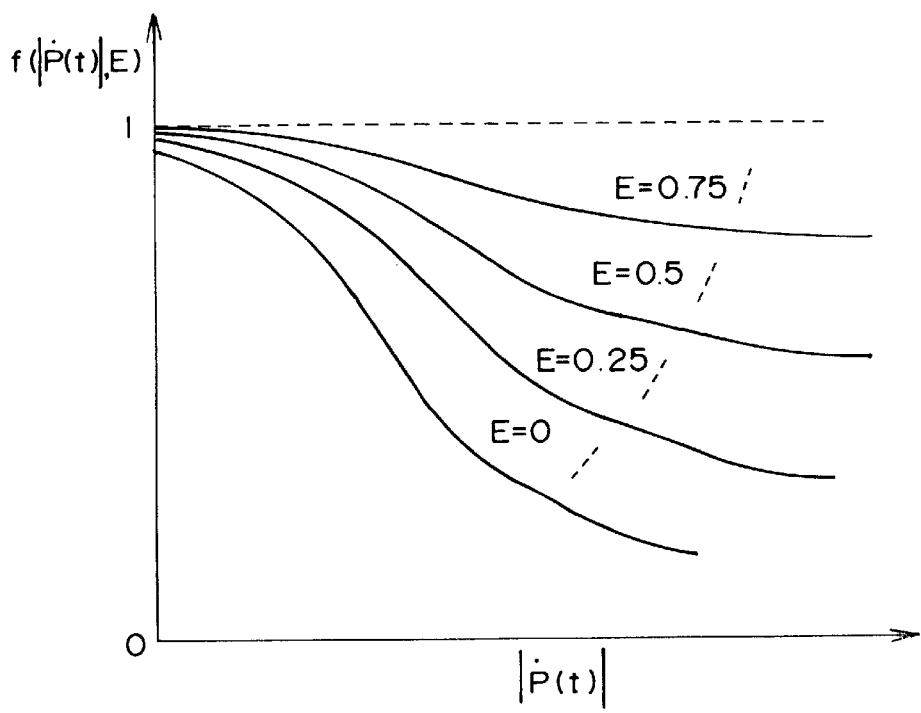
FIG. 6 is a graphical representation for use in describing an example of a propagation loss fluctuation bandwidth evaluation function that is applied to the present invention.

FIG. 6 shows an example of the function f. The propagation loss fluctuation bandwidth evaluation function f is determined such that the value of the function f(|P(t)'|,E) becomes smaller with the higher fluctuation rate |P(t)'| of the pilot signal reception levels and with the smaller propagation environment parameter E. Accordingly, expansion of the pass band of the averaging filter unit 5 allows more precise acquirement of the propagation loss component when the mobile station moves fast or when the propagation loss are expected to fluctuate rapidly.

Figure 7:
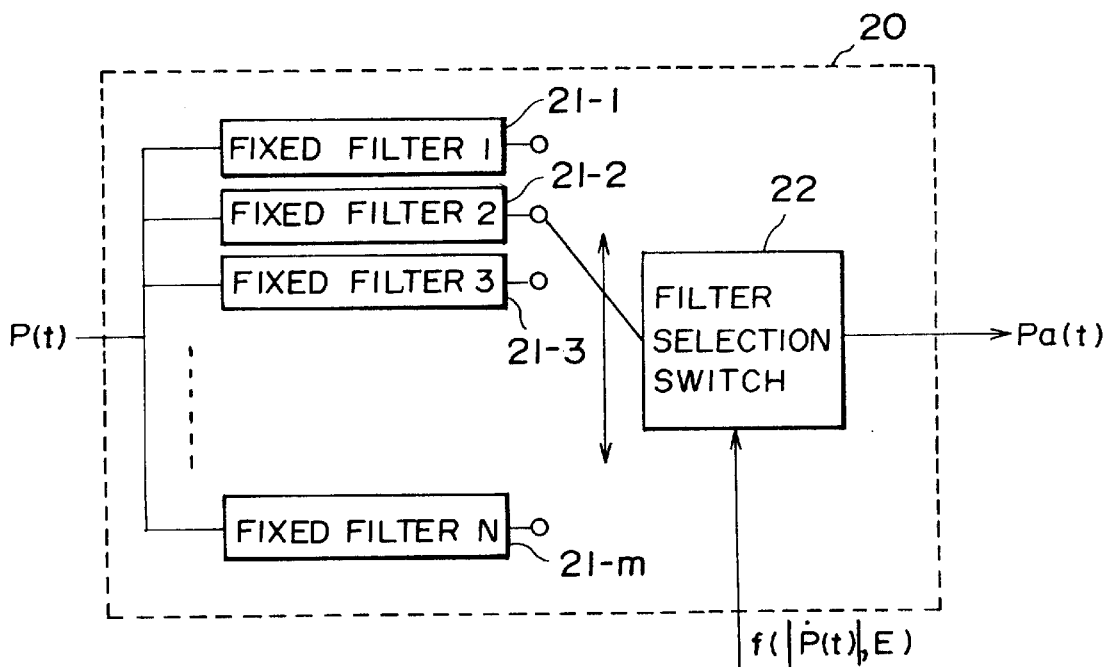
FIG. 7 is a block diagram showing a second example of an averaging filter implemented in the present invention.

Next, another example of the averaging filter unit is described with reference to FIG. 7. As shown in FIG. 7, an averaging filter 20 comprises a fixed filters 21-1 through 21-m having different fixed pass band characteristics and a filter selection switch 22 for selecting one of the fixed filters.

FIG. 8 shows frequency characteristics of a group of filters formed of the fixed filters 21-1 through 21-m. As shown in FIG. 8, the filter bearing the smaller number has the narrower pass band. The filter selection switch 22 chooses one of the fixed filters based on the output of the propagation loss fluctuation bandwidth evaluation function f.

Referring to FIG. 9, an example of a technique to select the fixed filter is described. The fixed filter having the broader pass band is selected with the smaller output of the propagation loss fluctuation bandwidth evaluation function f, that is, with the broader propagation loss fluctuation bandwidth.

Figure 10:
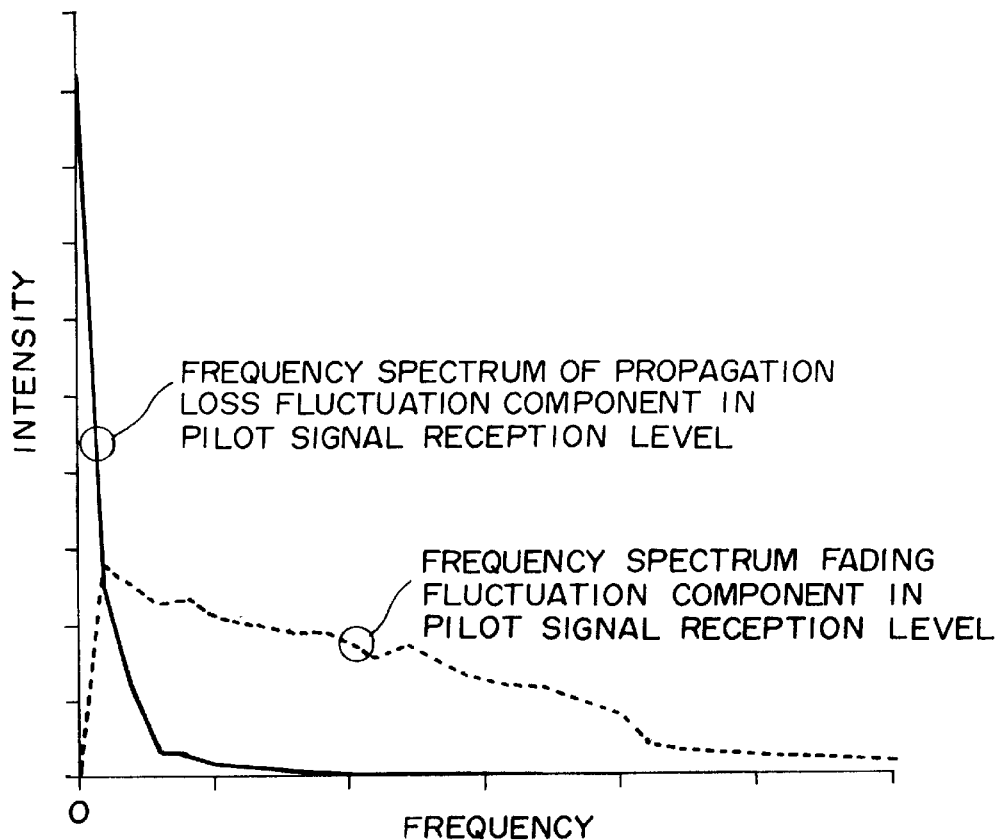
FIG. 10 shows frequency spectrum of a propagation loss fluctuation component and a fading fluctuation component included in the pilot signal reception level.

FIG. 10 shows frequency spectrum of a propagation loss fluctuation component and a fading fluctuation component included in the pilot signal reception level. As shown in FIG. 10, the bandwidth in which the propagation loss fluctuates is smaller than the bandwidth in which the fading fluctuates. The fluctuation of the propagation loss component is more sluggish than that of the fading component. Therefore, only the propagation loss fluctuation component can be acquired by means of passing the spectrum through the narrow-band pass filter. The rate of the propagation loss fluctuation is higher than the moving speed of the mobile station.

Figure 11:
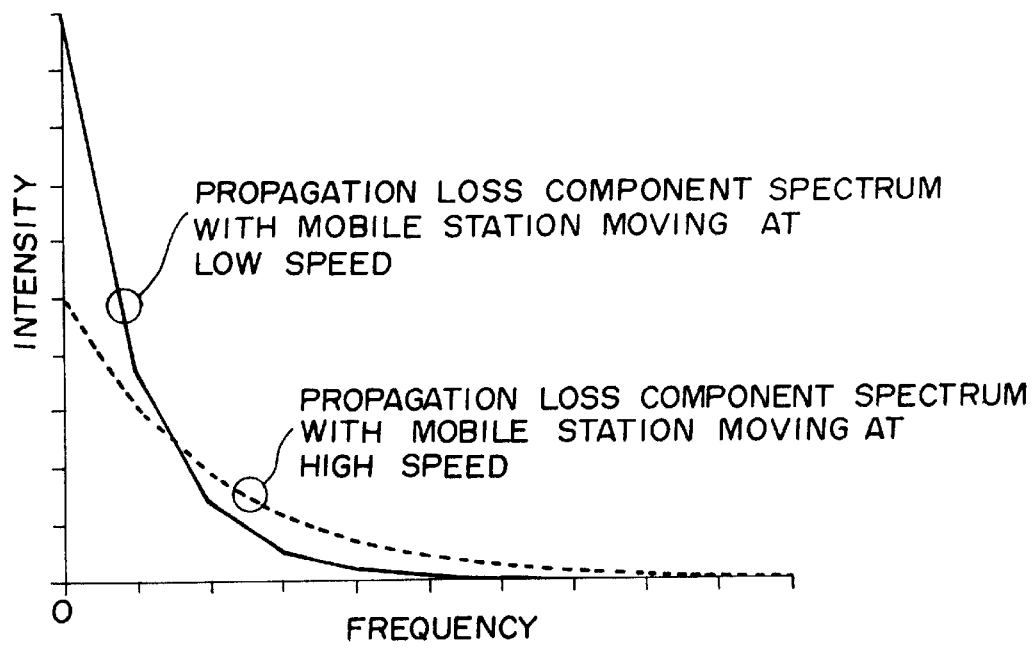
FIG. 11 shows a difference in frequency spectrum between the propagation loss fluctuation components included in the pilot signal reception levels for mobile stations moving at a low speed and a high speed.

FIG. 11 shows a difference in frequency spectrum between the propagation loss fluctuation components included in the pilot signal reception levels for mobile stations moving at a low speed and a high speed. The propagation loss fluctuates in a wider range of the bandwidth when the mobile station moves fast. The spectrum band in which the propagation loss fluctuates depends on the environment of the mobile station. In general, radio wave propagation path approaches the ground surface when the antenna is low and the cell radius is small in an area crowded with buildings. The area crowded with buildings includes many obstacles that block the radio wave. Therefore, propagation of a short distance results in a significant difference of the propagation loss, with a broad propagation loss fluctuation bandwidth.

Figure 12:
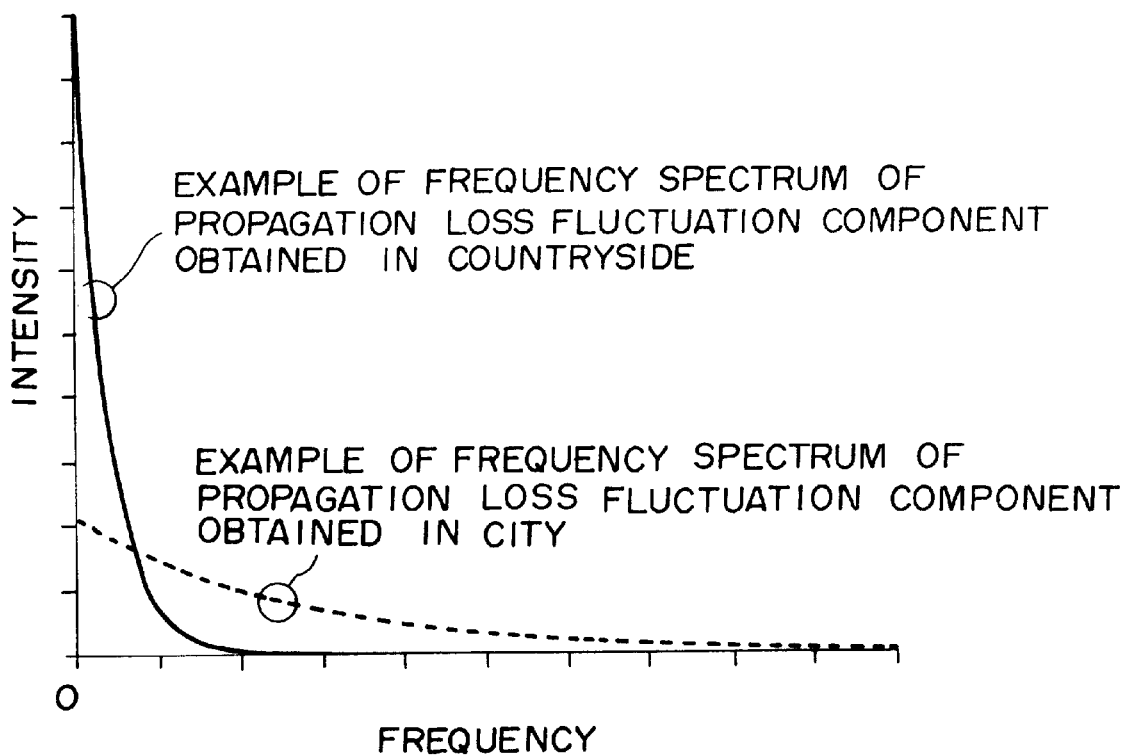
FIG. 12 shows a difference in frequency spectrum between the propagation loss fluctuation components included in the pilot signal reception levels for mobile stations in a city and in a countryside.

FIG. 12 shows a difference in frequency spectrum between the propagation loss fluctuation components included in the pilot signal reception levels for the mobile station in a city and in a countryside, in which the mobile station moves at a predetermined speed. The propagation loss fluctuation bandwidth is relatively broad. Therefore, the system for averaging the reception levels at which the pilot signals are received according to the present invention predicts the propagation loss fluctuation bandwidth by means of the propagation loss fluctuation bandwidth predicting unit 4. The system then chooses and uses the proper variable filter depending on the prediction result. This makes it possible to acquire the propagation loss component precisely independent of the moving speed of the mobile station and the propagation environment.

Figure 13:
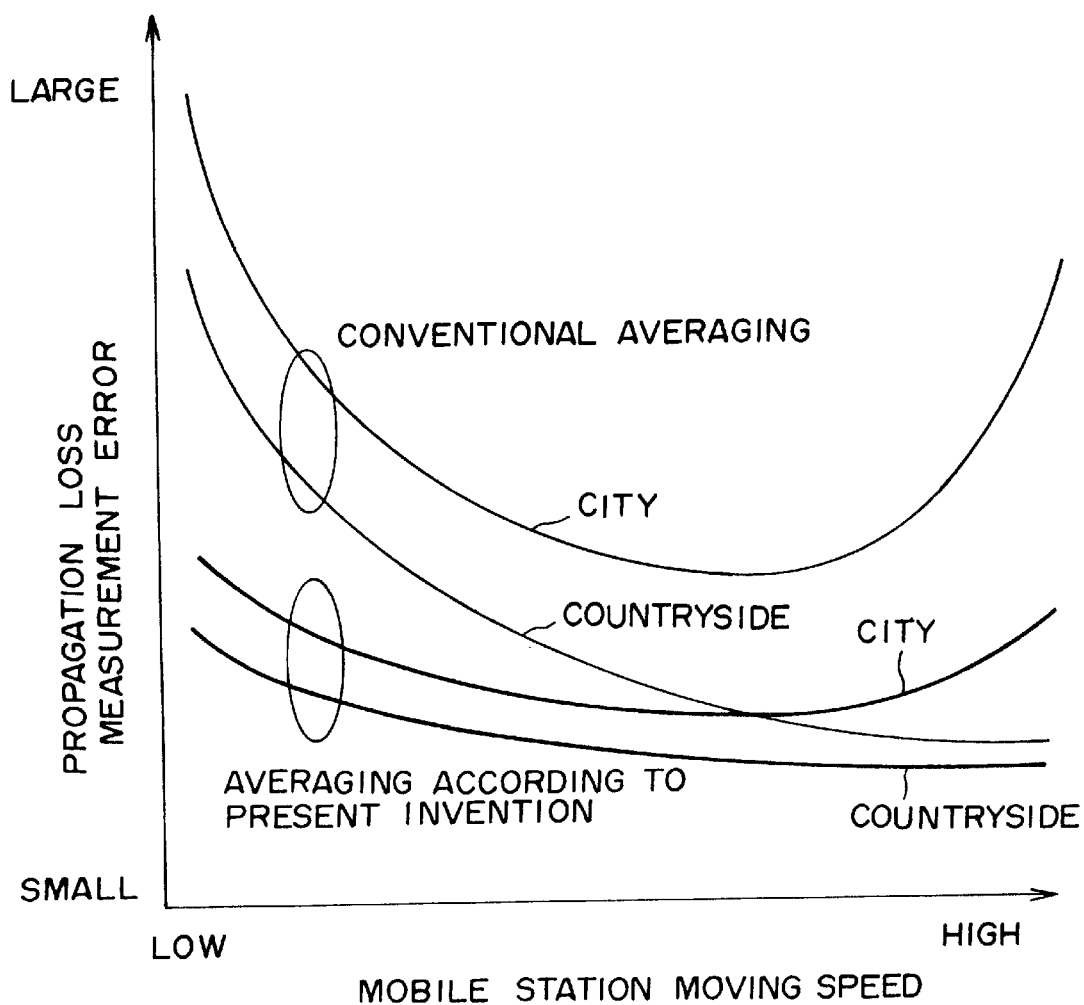
FIG. 13 is a graphical representation of a propagation loss measurement error as a function of a speed of a mobile station.

FIG. 13 is a graphical representation of propagation loss measurement errors as a function of a speed of a mobile station in a city and in a countryside after the averaging of the reception levels at which the pilot signals are received, according to the conventional technique and the present invention. In both cases, the propagation loss measurement errors are larger in the city with the larger propagation loss fluctuation than in the countryside. The system according to the present invention reduces a difference in propagation loss measurement error due to the difference in moving speed of the mobile station, as compared with the case applying the conventional technique. In particular, the propagation loss measurement error is improved significantly as compared with the case applying the conventional technique when the mobile station moves relatively slowly. Such a remarkable improvement results from the proper choice of the variable filter based on the fluctuation rate of the pilot signal reception levels. In addition, the proper averaging filter is selected according to the prediction result on the propagation environment. Therefore, the system of the present invention achieves smaller difference in propagation loss measurement errors between the city and the countryside than the one obtained by using the conventional technique.

As described above, according to the present invention, only the propagation loss can be acquired precisely by means of proper choice of the filter depending on the fluctuation rate of the pilot signal reception levels and the radio wave propagation environment. As a result, the reliability of the entire system is improved with the reduced transmission power control error and the proper and correct choice of the base station.

What is claimed is:

1. A system for averaging reception levels at which the pilot signals are received in a cellular mobile radio communication system comprising base stations that send pilot signals all the time and a mobile station having a device for use in determining a reception level of the transmitted pilot signal as a pilot signal reception level, said base station comprising:

propagation environment parameter determining means for determining a propagation environment parameter; and means for transmitting the propagation environment parameter to said mobile station, and said mobile station comprising:

reception means for receiving the propagation environment parameter;

pilot signal reception level fluctuation rate detection means for detecting a fluctuation rate of the pilot signal reception level;

propagation loss fluctuation bandwidth predicting means for predicting a fluctuation bandwidth for a propagation loss component included in the pilot signal reception level; and an averaging filter of which the pass band characteristic is allowed to change, said mobile station predicting, as a predicted fluctuation bandwidth, the fluctuation bandwidth for the propagation loss component included in the pilot signal reception level, based on the propagation environment parameter and the fluctuation rate of the pilot signal reception level received by said reception means, said mobile station changing the pass band characteristics of said averaging filter according to the predicted fluctuation bandwidth, said mobile station passing the pilot signal through the averaging filter with the determined pass band characteristics to acquire only the propagation loss component.

2. A system for averaging reception levels at which the pilot signals are received as claimed in claim 1, wherein said propagation environment parameter determining means determines whether a radius of the cell for said base station is larger than a predetermined cell radius threshold value, and reflects the degree of the fluctuation rate to the propagation environment parameter with the assumption that the smaller cell radius results in the faster fluctuation of the propagation loss.

3. A system for averaging reception levels at which the pilot signals are received as claimed in claim 2, wherein the propagation environment parameter is set to zero when the radius of the cell is equal to or smaller than the predetermined cell radius threshold value, the propagation environment parameter being set to a value larger than zero when the radius of the cell is larger than the predetermined cell radius threshold value, the propagation environment parameter being set so that it becomes a larger value with a slower fluctuation of the propagation loss.

4. A system for averaging reception levels at which the pilot signals are received as claimed in claim 1, wherein said propagation environment parameter determining means determines whether a height of an antenna in said base station is larger than a predetermined antenna height threshold value, and reflects the degree of the fluctuation rate to the propagation environment parameter with the assumption that the lower antenna height results in the faster fluctuation of the propagation loss.

5. A system for averaging reception levels at which the pilot signals are received as claimed in claim 4, wherein the propagation environment parameter is set to a value larger than zero when the height of the antenna is larger than the predetermined antenna height threshold value, the propagation environment parameter being set so that it becomes to a larger value with a slower fluctuation of the propagation loss.

6. A system for averaging reception levels at which the pilot signals are received as claimed in claim 1, wherein said base station reflects the degree of the fluctuation rate to the propagation environment parameter with the assumption that a lower antenna in said base station results in a faster fluctuation of the propagation loss and that a smaller radius of the cell for said base station results in a faster fluctuation of the propagation loss.

7. A system for averaging reception levels at which the pilot signals are received as claimed in claim 1, wherein said averaging filter is a primary feedback filter that is adapted to change its pass band characteristics by using a feedback coefficient determined based on the fluctuation rate of the pilot signal reception level and the propagation environment parameter.

8. A system for averaging reception levels at which the pilot signals are received as claimed in claim 1, wherein said averaging filter comprises a plurality of fixed pass band filters each having different pass bands, and a filter selection switch, said averaging filter that is adapted to change its pass band characteristics by means of choosing one of the plurality of fixed pass band filters by using a feedback coefficient determined based on the fluctuation rate of the pilot signal reception level and the propagation environment parameter.

9. A system for averaging reception levels at which the pilot signals are received as claimed in claim 1, wherein said propagation loss fluctuation bandwidth predicting means controls the pass band characteristics of said averaging filter to be broader with the faster fluctuation rate of the pilot signal reception level and the faster propagation loss fluctuation rate indicated by the propagation environment parameter.

* * * * *